United States Patent [19]

Kuno et al.

[11] Patent Number: 4,908,786
[45] Date of Patent: Mar. 13, 1990

[54] ELECTRONIC CALCULATOR HAVING GRAPH DISPLAYING FUNCTION

[75] Inventors: Michiaki Kuno, Yamatokoriyama; Noboru Akizuki, Nara; Taizo Nishida, Yamatokoriyama, all of Japan

[73] Assignee: Sharp Kabushiki Jausga, Osaka, Japan

[21] Appl. No.: 109,280

[22] Filed: Oct. 16, 1987

[30] Foreign Application Priority Data

Oct. 17, 1986 [JP] Japan .................................. 61-247866
Oct. 21, 1986 [JP] Japan .................................. 61-250072
Oct. 21, 1986 [JP] Japan .................................. 61-250073

[51] Int. Cl.4 .............................................. G06F 15/02
[52] U.S. Cl. .................................. 364/710.11; 364/518
[58] Field of Search ..................... 364/710.01, 710.02, 364/710.14, 709.16, 706, 518, 200 MS File, 900 MS File, 710.11

[56] References Cited

U.S. PATENT DOCUMENTS 4,535,416  8/1985  Kano et al. ...................... 364/710.01
4,740,913  4/1988  Washizuka et al. ............ 364/710.01

Primary Examiner—Gary V. Harkcom
Assistant Examiner—Long T. Nguyen
Attorney, Agent, or Firm—Birch, Stewart Kolasch & Birch

[57] ABSTRACT

An electronic calculator having a graph displaying function is adapted so that when a display range along only one coordinate axis is specified, an optimum display range for the other coordinate axis is automatically determined for displaying a graph within the display ranges. The remainder of the graph other than the portion thereof presented on the graph display is shown from portion to portion by scrolling along the trace of the graph in accordance with the result of the calculation being performed to determine the remainder. All of the data in a random access memory (RAM) can be transferred to an external device for the protection of the data when the device is connected to the calculator.

7 Claims, 16 Drawing Sheets

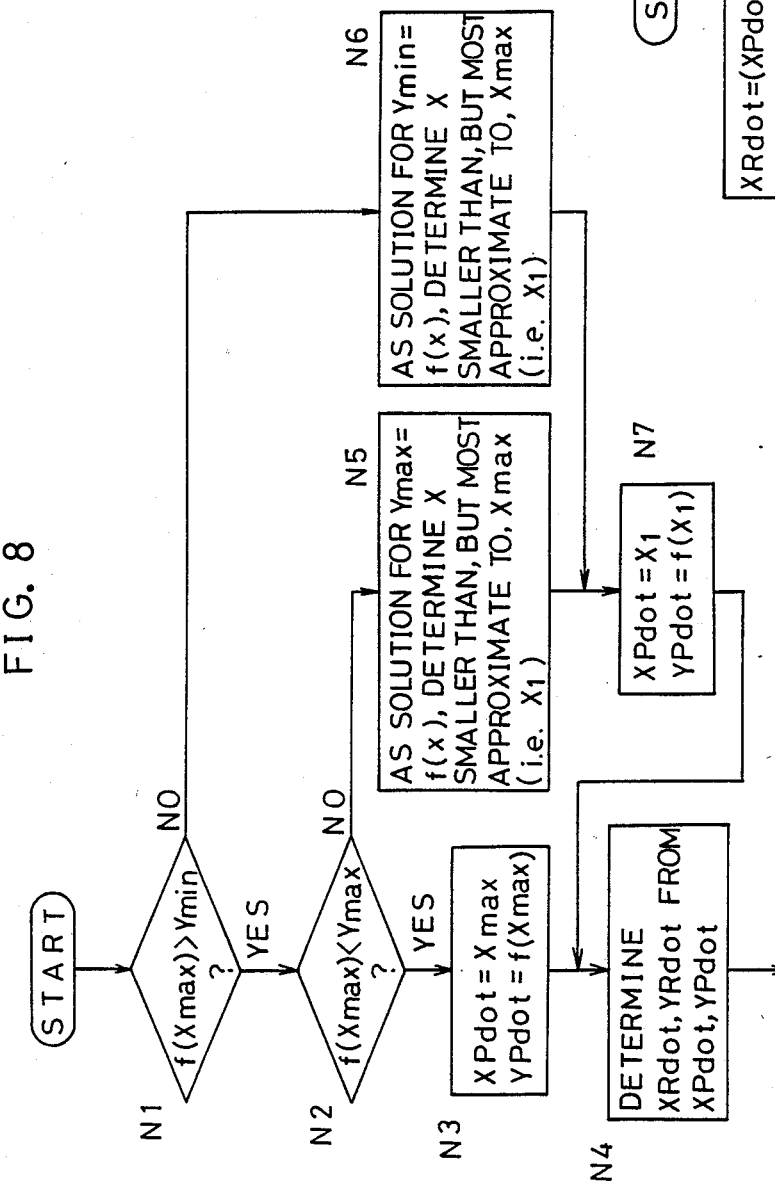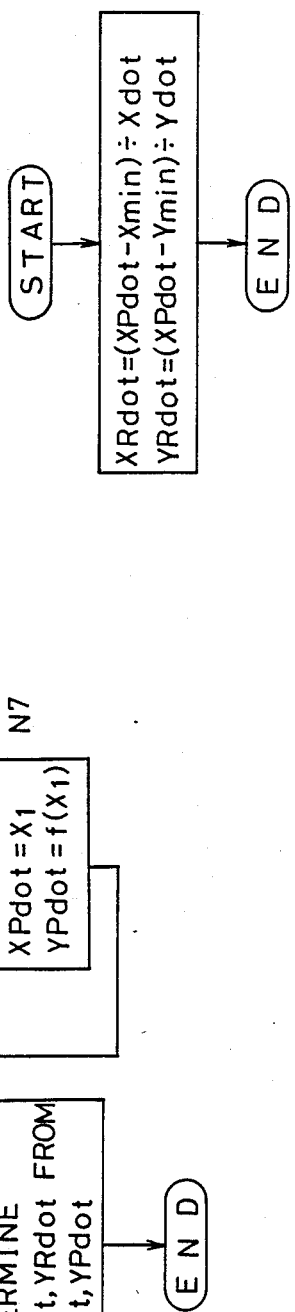

| DISP COPY | → 1 |
| PRINT | → 2 |
| SAVE | → 3 |
| LOAD | → 4 |

| ALL SAVE (BACK UP) | → 1 |
| SAVE | → 2 |

ELECTRONIC CALCULATOR HAVING GRAPH DISPLAYING FUNCTION

BACKGROUND OF THE INVENTION

1. Field of the Invention

The present invention relates to an electronic calculator adapted for displaying a graph obtained by processing graphic data input by calculation and graphing the result of calculation.

2. Description of the Prior Art

Electronic calculators are disclosed, for example, in U.S. Pat. Nos. 4,208,720, and 4,603,396, and 4,609,918. Also proposed are electronic calculators having a graph displaying function which includes a combination of such disclosed calculators. Such a calculator heretofore proposed and adapted for graphing an input functional equation and displaying the graph on a screen is provided with a phantom screen (buffer) on each of its upper and lower sides and the opposite lateral sides for displaying the remaining portion of the graph other than the portion thereof shown on the display screen. Thereby, the remaining portion of the graph on the phantom screen is shown on the display screen by operating a cursor.

However, the conventional calculator of the the type described has the problem of being unable to display the graph in its entirety since only one screen area of the remaining graph portion can be displaced with respect to each of the upward, downward and opposite lateral directions. To overcome this problem, it appears useful to prepare a multiplicity of phantom screens (buffers), but providing this multiplicity of screens results in a drawback of necessitating a memory of great capacity and increasing the cost.

SUMMARY OF THE INVENTION

The present invention provides an electronic calculator having a graph displaying function which includes a key input means, display means with a screen having a uniform distribution of a multiplicity of display dots over a predetermined area and adapted to display graphs using a two-dimensional coordinate system, first memory means for storing a functional equation entered by the key input means, a first calculating means for calculating the functional equation for a range of coordinates specified by the key input means on the two-dimensional coordinate system, second calculating means for calculating the functional equation for a specified range every time a tracing instruction is given by the key input means, second memory means for storing the results of calculations obtained by the first and second calculating means, and display control means for displaying a graph corresponding to the results of calculation of the first calculating means over the entire screen of the display means, subsequently scrolling the graph in response to the tracing instruction and displaying the result of calculations of the second calculating means in addition to the graph.

The main object of the present invention is to provide an electronic calculator having a graph displaying function adapted so that the remainder of a graph other than the portion thereof presented on its display screen is displayed from portion to portion by scrolling along the trace of the graph, in accordance with the result of calculation being performed to determine the remainder. Thereby, the graph can be displayed in its entirely on the display screen without using additional memory.

Preferably, the display means is a liquid crystal display having a multiplicity of liquid crystal cells arranged in the form of a matrix.

The calculator has computing means for computing a display range of coordinates along the other axis from the functional equation based on a display range of coordinates along one axis specified by the key input means. Thereby, the display range of coordinates along one axis is specified, and the display range of coordinates along the other axis can be automatically determined to display the graph corresponding to the resulting calculation from the first calculating means.

The calculator further includes a connector for connecting an external device to the calculator, a detector for detecting whether the connected external device is the specified device, a transfer device for transferring the information in the first and second memory means to the specified external device in response to an instruction from the key input means when the specified external device is connected to the calculator, whereby the stored information can be protected.

BRIEF DESCRIPTION OF THE DRAWINGS

The present invention will become more fully understood from the detailed description given hereinbelow and the accompanying drawings which are given by way of illustration only, and thus, are not limitative of the present invention, and wherein:

FIGS. 4 and 6 are flow charts, and FIGS. 5(A), 5(B), and 5(C) are being diagrams showing output data on the graph display;

FIGS. 7, 8, 9(A), 9(B), 9(C), 10 and 11 are diagrams for illustrating a process wherein the remainder of a graph other than the portion thereof presented on the graph display is shown from portion to portion by scrolling along the trace of the graph in accordance with the result of a calculation being performed to determine the remainder, FIGS. 7, 8, 10 and 11 are flow charts, and FIGS. 9(A), 9(B), and 9(C) are diagrams of presentations on the graph display which show a tracing start point; FIGS. 12, 16, 17, 18, 19, 20, 21, and 22 are flow charts, FIGS. 13 and 14 are diagrams showing examples of menus presented on the graph display, and FIG. 15 is a block diagram showing external devices that may be connected to the calculator.

DESCRIPTION OF THE PREFERRED EMBODIMENTS

Figure 1:
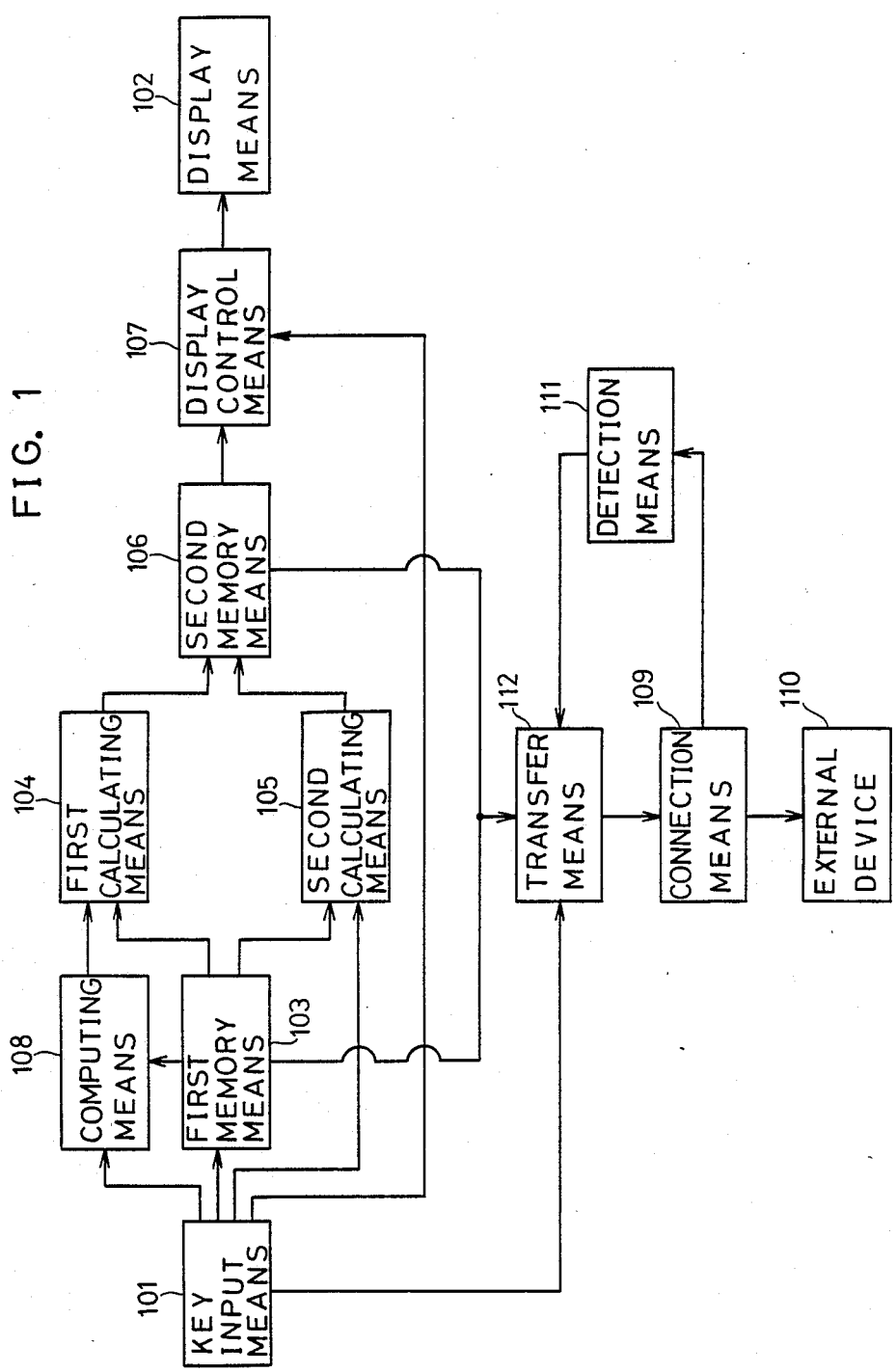
FIG. 1 is a block diagram showing a system embodying the invention.

FIG. 1 is a block diagram showing a system embodying the invention.

With reference to this drawing, the system includes key input means 101, display means 102 with a screen having a uniform distribution of a multiplicity of display dots over a predetermined area that is adapted to display graphs using a two-dimensional coordinate system, first memory means 103 for storing a functional equation entered by the key input means 101, first calculating means 104 for calculating the functional equation for a range of coordinates specified by the key input means 101 on the two-dimensional coordinate system, second calculating means 105 for calculating the functional equation for a specified range every time a tracing instruction is given by the key input means 101, second memory means 106 for storing the results of calculations obtained by the first calculating means 104 and second calculating means 105. Furthermore, the system includes display control means 107 for displaying a graph corresponding to the result of calculation of the first calculating means 104 over the entire screen of the display means 102, subsequently scrolling the graph in response to the tracing instruction and displaying the result of the calculation of the second calculating means 105 in addition to the graph, computing means 108 for computing a display range of coordinates along the other axis from the function based on a display range of coordinates along one axis specified by the key input connection means 101, means 109 for connecting an external device 110 to the calculator, detection means 111 for detecting whether the connected external device 110 is the specified device, and transfer means 112 for transferring the information in the first and second memory means 103 and 106 to the specified external device 110 in response to an instruction from the key input means 101 when the specified external device 110 is connected to the calculator.

Figure 2:
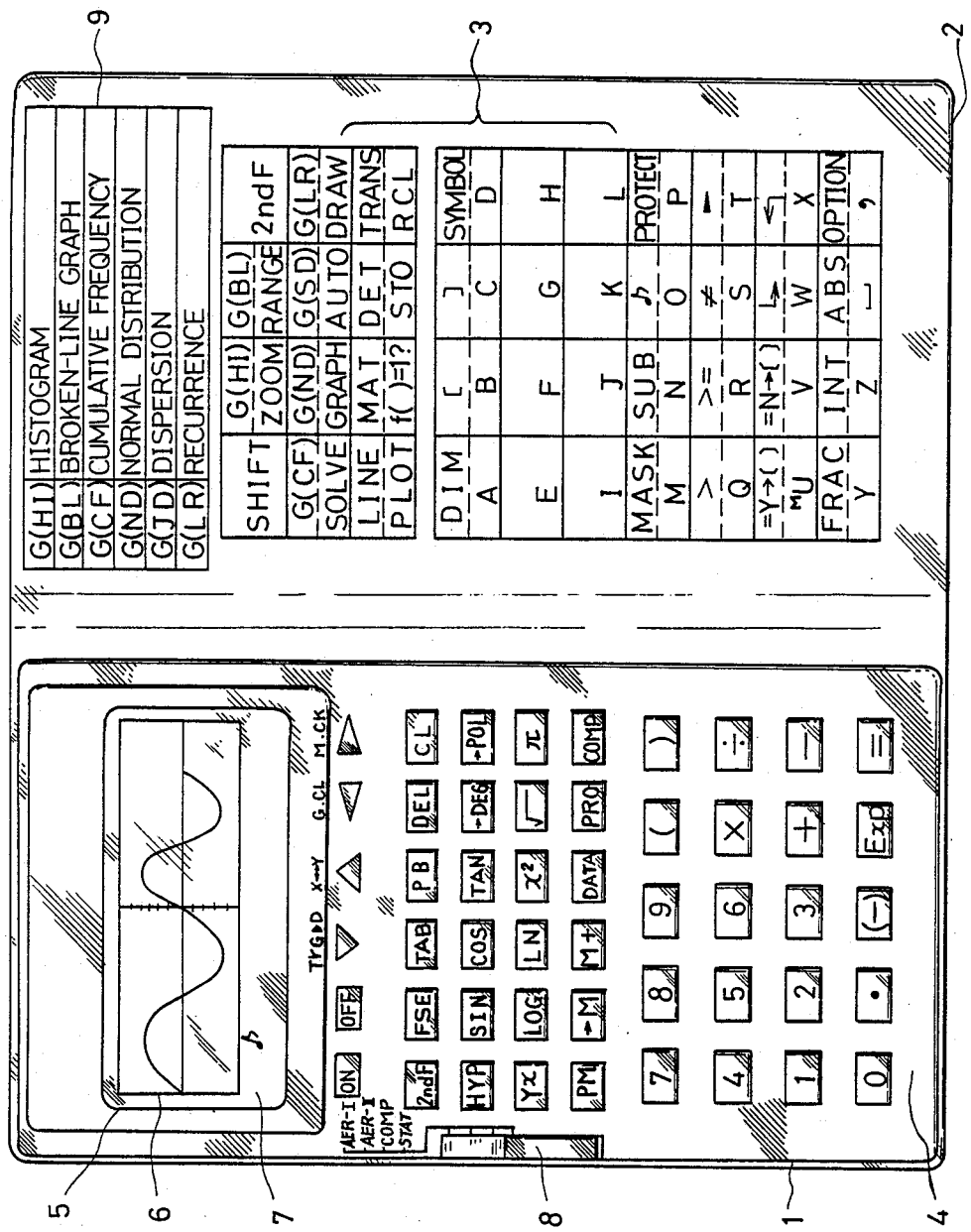
FIG. 2 is a plan view showing the appearance of an electronic calculator having a graph displaying function and embodying the invention.

FIG. 2 is a plan view showing the appearance of an electronic calculator having a graph displaying function in an embodiment of the present invention. With reference to FIG. 2, the main body 1 of the calculator is provided on the left side portion of a flexible cover 2 which may be folded in two at the center, and a key input arrangement 3 is provided on the right side portion of the cover 2. The key input arrangement 3 is electrically connected to the calculator main body 1 and is adapted to enter inputs into the main body 1 by keys of the arrangement 4 on the main body 1. The kind, number and arrangement of keys for the arrangements 3 and 4 can be those generally used in the art.

A display device 5 includes a graph display 6 in the form of a liquid crystal display (LCD) of 96×32 dots which is adapted to present characters in 4 rows, 16 characters in each row, and a graph. The display device 5 further includes a status display 7 which is adapted so that when a particular key is depressed, a graphic symbol or the like is displayed to indicate the corresponding state. A slidable mode change switch 8 selects either the COMP mode (wherein various calculations are primarily performed), STAT mode (relating to statistics), and AER-1 or the AER-II (for storing algebraic expressions). Labels 9 are used for indicating the kind of graph to be presented on the graph display 6.

The "SOLVE" key is a root finding key for finding an intersection point (root) of a plurality of graphs on the display screen.

The "GRAPH" key is a graphic instruction key which is depressed before the mathematical expression to be graphed for display. This instruction is executed by depressing the "DRAW" key.

The "AUTO" key is an automatic graphing instruction key for automatically setting a range for the y-axis of the graph to be drawn for a mathematical expression entered.

The "DRAW" key is a graphic display execution key.

The "PLOT" key is an instruction key for plotting coordinates (a point) on the graph display screen.

The "LINE" key is an instruction key for interconnecting two points on the graph display screen.

The "ZOOM" key is an execution key for enlarging or reducing the scale of the presentation on the graph display screen for a predetermined magnification.

The "G.CL" key is a key for clearing the graph display screen except the coordinate axes.

Figure 3:
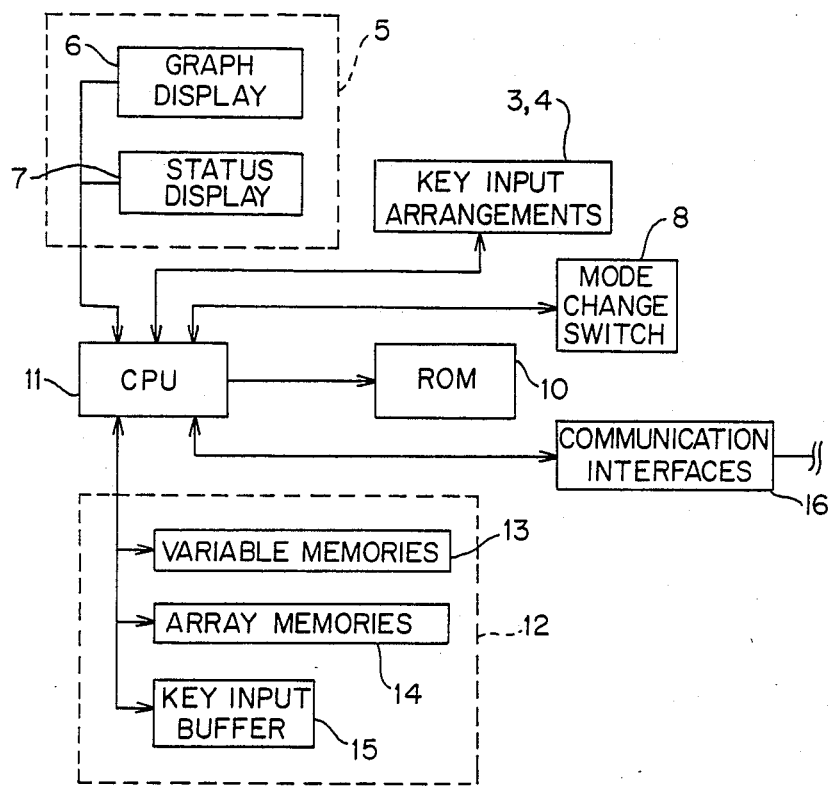
FIG. 3 is a block diagram showing the construction of the calculator.

FIG. 3 is a block diagram showing the electronic calculator having a graph displaying function and shown in FIG. 2. The diagram shows the above-mentioned key input arrangements 3 and 4, the display device 5 includes the graph display 6, the status display 7, and mode change switch 8. The diagram further shows a ROM (read-only memory) 10 for storing various programs, a CPU (central processing unit) 11 for controlling various calculations and for controlling the other blocks according to the programs in the ROM 10, and a RAM (random access memory) 12 having a capacity of 8 K bytes. The RAM 12 is one universal and includes a group of variable memories 13, a group of array memories 14 for the actual contents of arrays and a key input buffer 15, etc.

The array memory groups 14 has no actual numerical values stored therein but pointers and dimensions of the arrays having the address of the actual contents of the arrays and the key input buffer 15 are stored therein.

The key input arrangements 3 and 4 have 90 key switches in total. When the keys are manipulated, they are used to turn on or off the power supply, enter equations or expressions for calculations and execute various instructions. Each key has between one and five kinds of functions in accordance with the combination thereof with other keys to be depressed, the state indicated on the status display 7 and the setting of the mode change switch 8. Also, FIG. 3 shows a communication interface circuit 16.

The operation of the calculator in the present invention will be described below with reference to FIGS. 4 to 22.

Some of the terms used in the flow charts of FIG. 4 et seq. will be described below.

(1) Xsft, Ysft: scroll dot number on the graph display 6.

(2) XPdot, YPdot: x,y coordinates of a dot currently flickering on a graph.

(3) XRdot, YRdot: x, y coordinates of XPdot, YPdot on the screen.

(4) Xmax(min), Ymax(min): display ranges on the screen.

(5) Xdot, Ydot: the sizes of x, y per dot on the screen determined from x max(min), Ymax(min).

Figure 5:
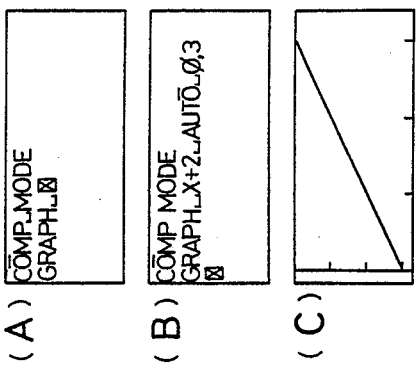
FIGS. 4, 5(A), 5(B), 5(C) and 6 are diagrams for illustrating a process wherein a display range along one of two axes (x or y) is specified for automatically determining a display range along the other axis (y or x) for showing a graph on a graph display.
Figure 4:
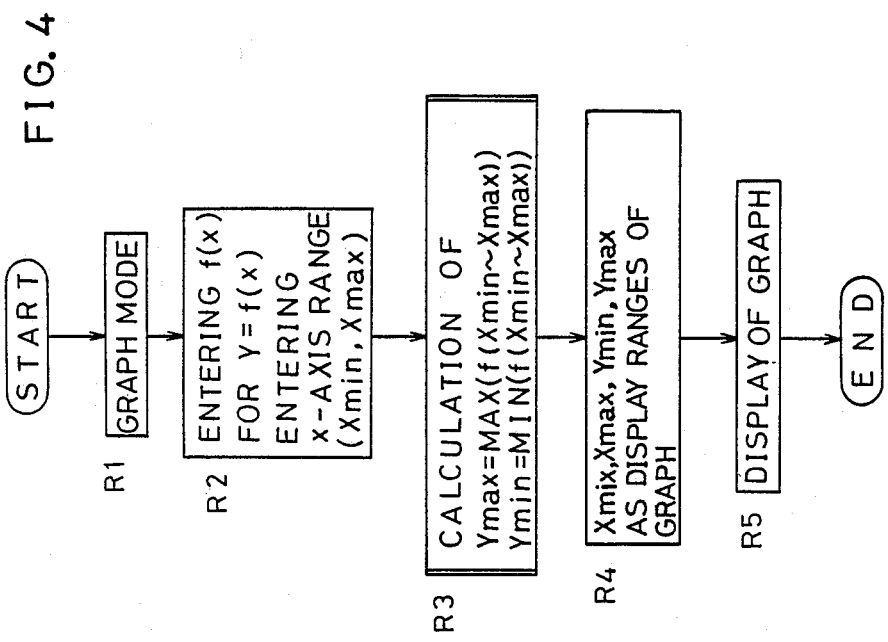
Figure 6:
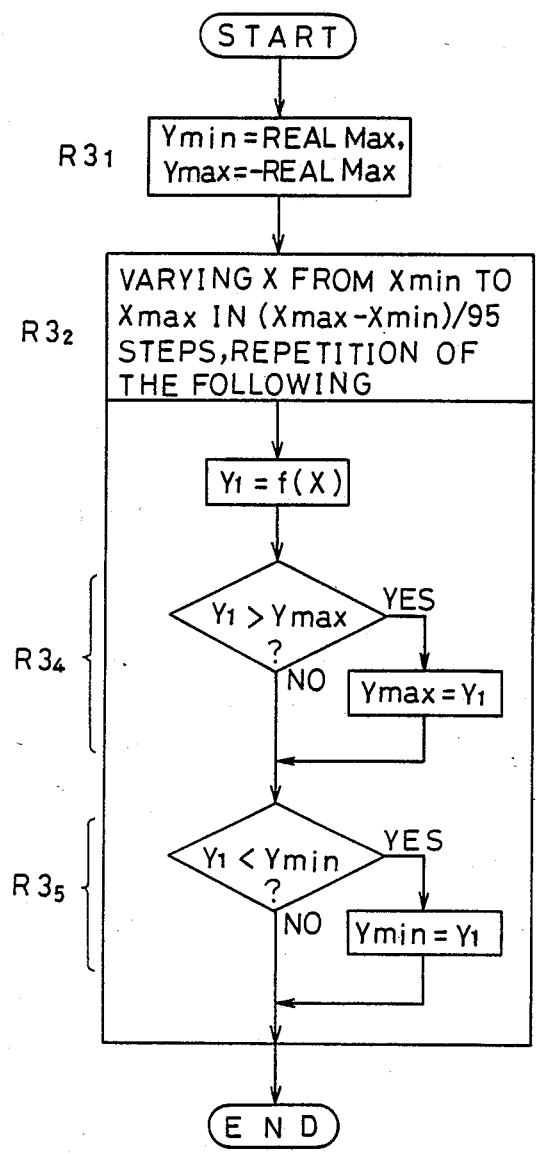

FIGS. 4 to 6 are diagrams for illustrating a process wherein a display range along one of two axes (x or y)

is specified to thereby automatically determine a display range along the other axis (y or x) for showing a graph on the graph display 6. FIGS. 4 and 6 are flow charts, and FIG. 5(A) to FIG. (C) are diagrams showing output data on the graph display 6.

With reference to FIG. 4, the calculator is first brought into a mode wherein the functional equation $Y=f(x)$ can be graphed in step R1. More specifically, the mode change switch 8 is moved to bring the calculator into the COMP mode, and the "GRAPH" key in the key input arrangement 3 is then depressed to bring the calculator into the graph mode. FIG. 5 (A) shows the data presented on the screen of the graph display 6 at this time.

Next in step R2, the f(x) portion of the functional equation $Y=f(x)$ is entered, and a display range, (Xmin, Xmax) along the x-axis is further entered. For example, suppose the equation $Y=x+2$ is to be graphed, with the display range of 0 to 3 along the x-axis. The keys then depressed are: "X" +"2" "AUTO" "0" "," "3" "DRAW". The graph display 6 gives the presentation shown in FIG. 5 (B) on its screen.

Step R3 then follows, in which a display range along the y-axis is computed by calculating Ymax=MAX(f(Xmin~Xmax)) and Ymin=MIN(f(Xmin~Xmax)). The subroutine for performing this step R3 is shown in FIG. 6. First in step R31, tentative Ymin and Ymax values are set. The term Real Max refers to the greatest value that can be handled by the present system.

The sequence then proceeds to step R32 which specifies the number (96) of repetitions for steps R33 to R35 as will be stated below. This is expressed in BASIC as FOR. X=Xmin TO Xmax Step. (Xmax−Xmin)/95. The number 95 is obained by subtracting the a value of one from the number of dots (96 dots) in the horizontal direction of the graph display 6. In this way, the series of steps can be performed repeatedly 96 times.

The value Y for X is calculated in step R33 to obtain the value Y1, which is stored in the work area for use in FIG. 4, step R5. Subsequently, Ymax is rewritten in step R34, and Ymin is further rewritten in step R35. In this way, steps R33 to R35 are repeated 96 times to complete the present subroutine.

Step R4 of FIG. 4 then follows in which Xmin, Xmax, Ymin and Ymax are taken as data indicating the display ranges of the contemplated graph. Based on this data, the graph is displayed in step R5 as shown in FIG. 5 (C). Thus, specifying the display range 0 to 3 is specified along the x-axis and automatically determines the display range 0 to 3 in the y-axis direction, and the graph of $Y=f(x)$ is displayed within these ranges.

In this way, when the display range along the x-axis is merely specified for the equation entered, the display range along the y-axis can be determined automatically, and the graph of the input equation can be presented on the graph display 6 within the specified ranges.

In determining the display range along the y-axis, the display range may be determined by obtaining Ymin toward the decreasing direction, and Ymax toward the increasing direction in view of the scale along the y-axis, i.e. to match the range to the scale. Ymin and Ymax can alternatively be determined in terms of a minimum and a maximum being obtained by differentiation.

The display range along the y-axis is automatically determined according to the process described. Conversely, the display range along the x-axis may be determined automatically.

FIGS. 7 to 11 are diagrams for illustrating a process wherein the remainder of a graph other than the portion thereof presented on the graph display 6 is displayed from portion to portion by scrolling along the trace of graph in accordance with the result of the calculation being performed to determine the remainder. FIGS. 7, 8, 10 and 11 are flow charts, and FIG. 9 (A) to FIG. 9 (C) are diagrams showing presentations on the graph display 6.

Figure 7:
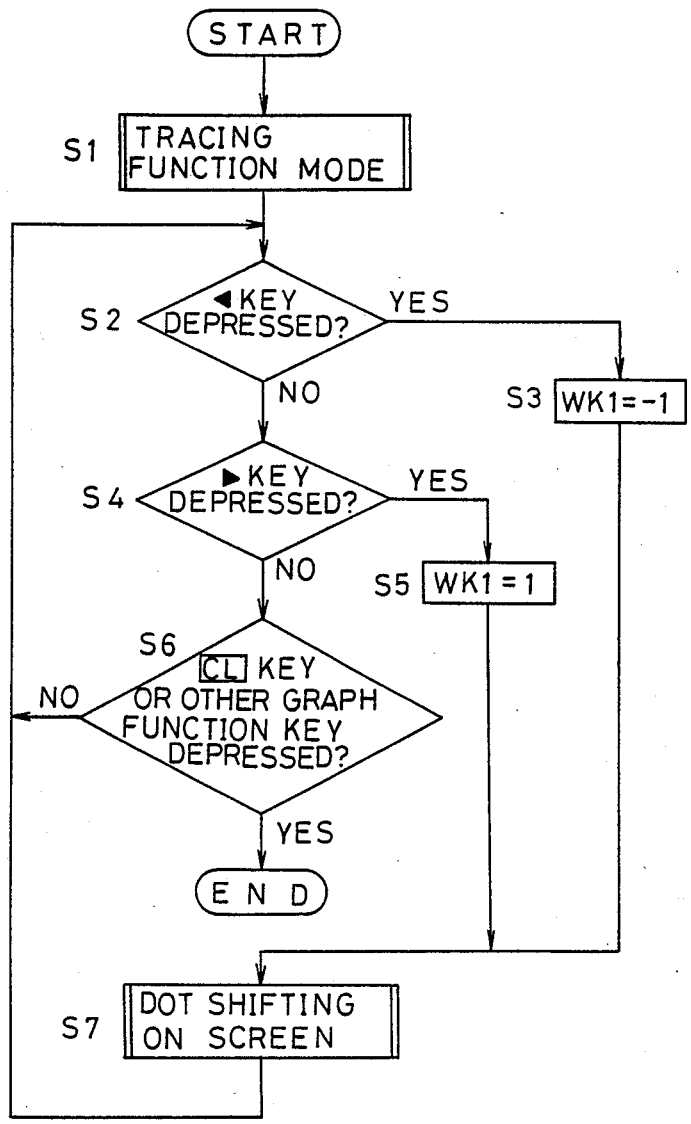
Figure 9A:
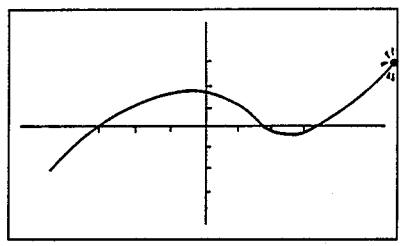
Figure 9B:
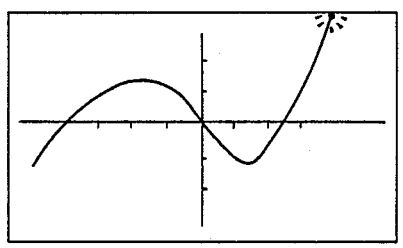
Figure 9C:
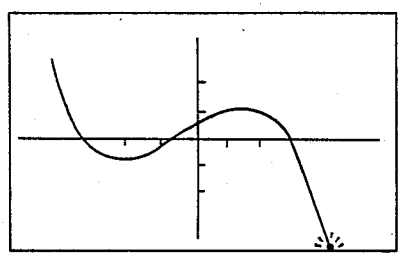

With reference to FIG. 7, the tracing function mode is started when the ◁ key or the ▷ key is depressed and the graph of $y=f(x)$ or the like is presented on the graph display 6 (step S1). In this mode, the steps shown in FIG. 8 are performed to find a tracing start point (dot) of the graph, and the point flickers on the display as shown in FIGS. 9 (A) to (C). When the ◁ key is depressed, the process causes the cursor on the screen to flicker at a position closest to its right end to the greatest possible extent. FIG. 9 (A) shows an example of presentation by step n3 in FIG. 8. The expression XPdot=Xmax, YPot=f(Xmax) indicates that the flickering dot is positioned on the screen most closely to its right end. The x coordinate of the dot is Xmax, and the y coordinate is f(Xmax). FIG. 9 (B) shows an exemplary presentation of step n6 in FIG. 8, while FIG. 9 (C) shows an exemplary presentation of step n5 in FIG. 8. FIG. 10 shows step n4 of FIG. 8 specifically.

When the flickering tracing start point is displayed, steps S2 to S5 in FIG. 7 follow, in which the ◁ key or the ▷ key depressed is detected, and the depressed key is stored in a work area WK1 (step S3 or step S5). The sequence then proceeds to step S7. If neither of these keys has been depressed, step S6 follows for checking whether the clear key any other graph function key have been depressed. When one of the keys is detected to have been depressed, the present routine is completed.

Figure 11:
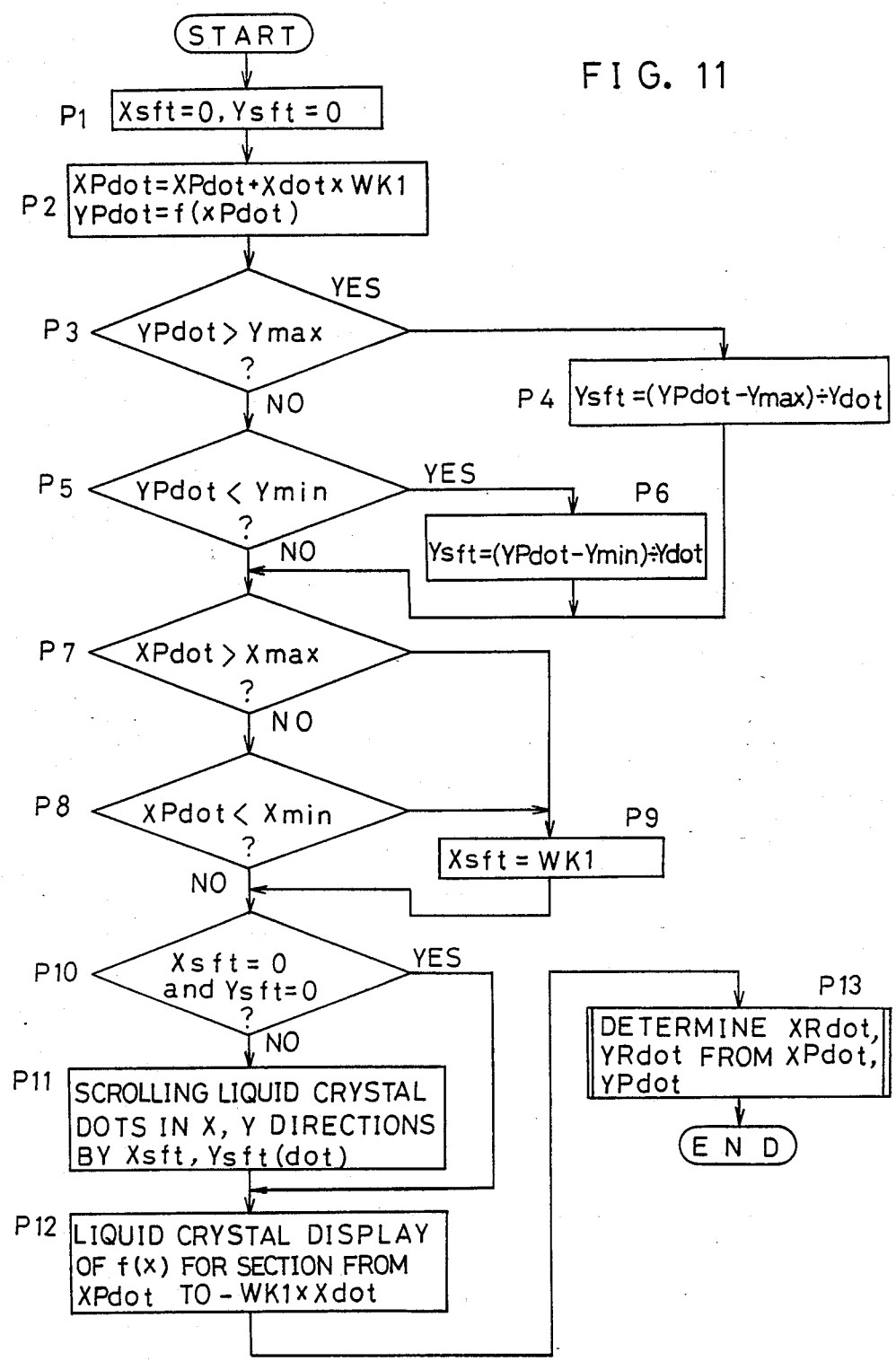

FIG. 11 shows step S7 in detail. The steps shown in this diagram will be described. Following initialization (step P1), step P2 is performed to find the x and y coordinates, i.e. XPdot, YPdot, of the flickering dot on the graph. Steps P3 and P5 check whether there is a need for scrolling in the y-axis direction. If scrolling is necessary, the number of dots to be scrolled is determined in steps P4 and P6. Similarly, steps P7, P8 and P9 check scrolling along the x-axis, and step P10 inquires whether scrolling is necessary. When scrolling is determined to be necessary, step P11 follows, in which the graph is scrolled by Xsft, Ysft (dot) along the x, y-axes directions. On the other hand, when there is no need for scrolling, step P10 is immediately followed by step P12. In step 12, the scrolled portion of the graph is presented on the graph display 6. Further in step P13, XPdot, YPdot of the dot to be subsequently flickered on the graph are found.

Thus, when the ◁ key or the ▷ key (tracing instruction key) is depressed, the remainder of the graph other than the graph portion displayed on the screen is determined from portion to portion by the calculating means, and based on the result of the calculation, the graph remainder is scrolled and displayed from portion to portion along the trace thereof, while the tracing start point is also displayed by flickering.

Figure 12:
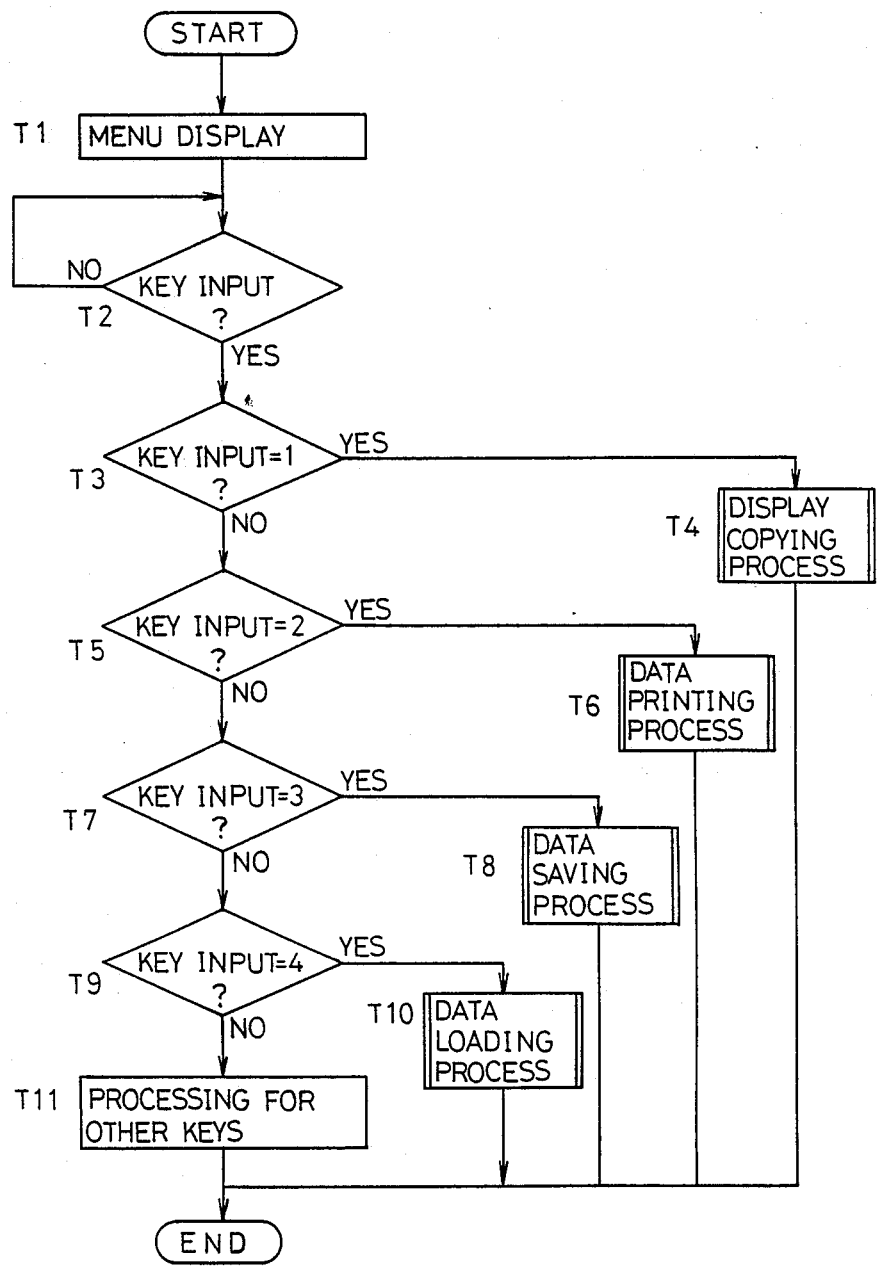
FIGS. 12, 13, 14, 15, 16, 17, 18, 19, 20, 21, and 22 are diagrams for illustrating a collective information backup process which is to be executed when a specified external device is connected to the calculator of the present invention for protecting all of the contents of a RAM by transferring the data to the external device.
Figures 13, 14, 15:
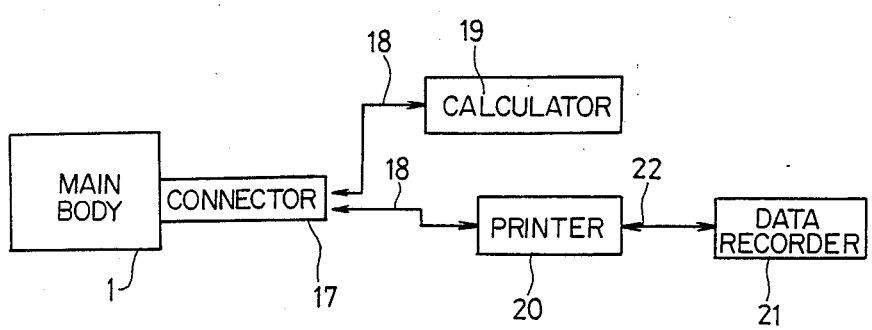

FIGS. 12 to 22 are diagrams for illustrating a collective information backup process which is to be executed when a specified external device is connected to the calculator of the invention for protecting all of the contents of the RAM by transferring the data to the external device. FIGS. 12 and 16 to 22 are flow charts, FIGS. 13 and 14 are diagrams showing examples of menus presented on the graph display 6, and FIG. 15 is a block diagram showing external devices that are connected to the present calculator.

FIG. 12 is a flow chart showing the routine in the data input-output mode. When the calculator is brought into this mode (step T1), the menu shown in FIG. 13 is provided on the display.

Now, when the "1" key is depressed (steps T2, T3), step T4 follows for executing a display copying process.

Figure 16:
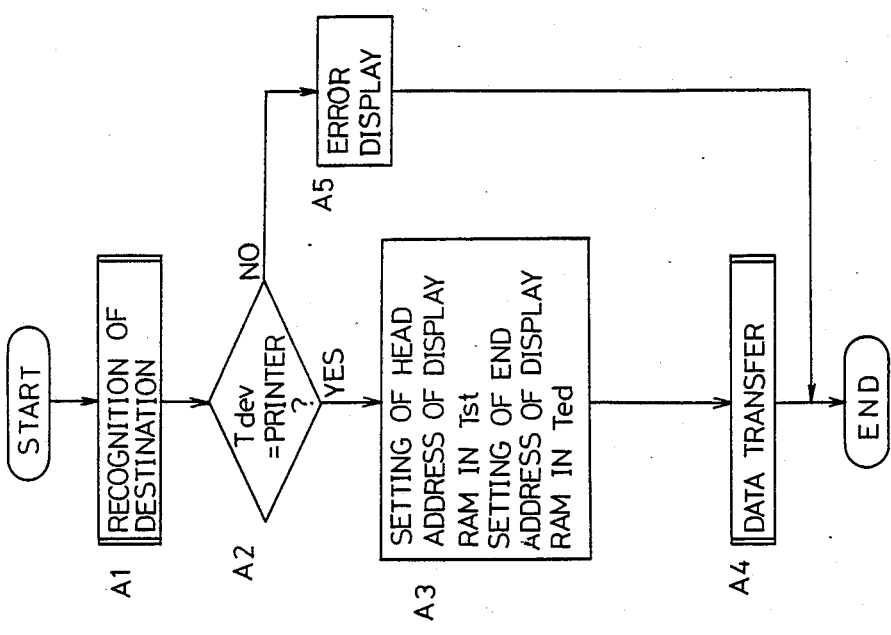

The display copying process is shown in FIG. 16. First, the external device connected to the calculator is identified by the destination recognition subroutine shown in FIG. 20. When a printer is connected (steps A1 and A2), the head address and the end address in the display RAM are set as variables, and all the data in the RAM 12 is transferred to the printer through the data transfer subroutine of FIG. 22.

Figure 17:
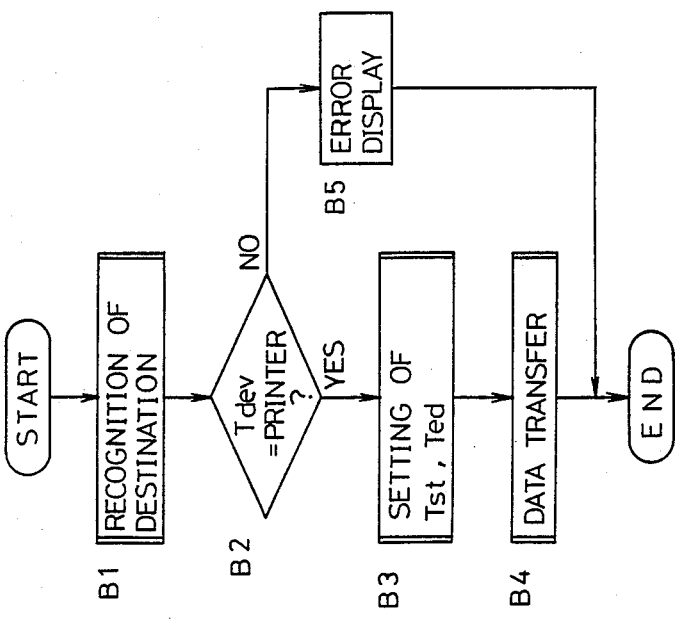
Figure 18:
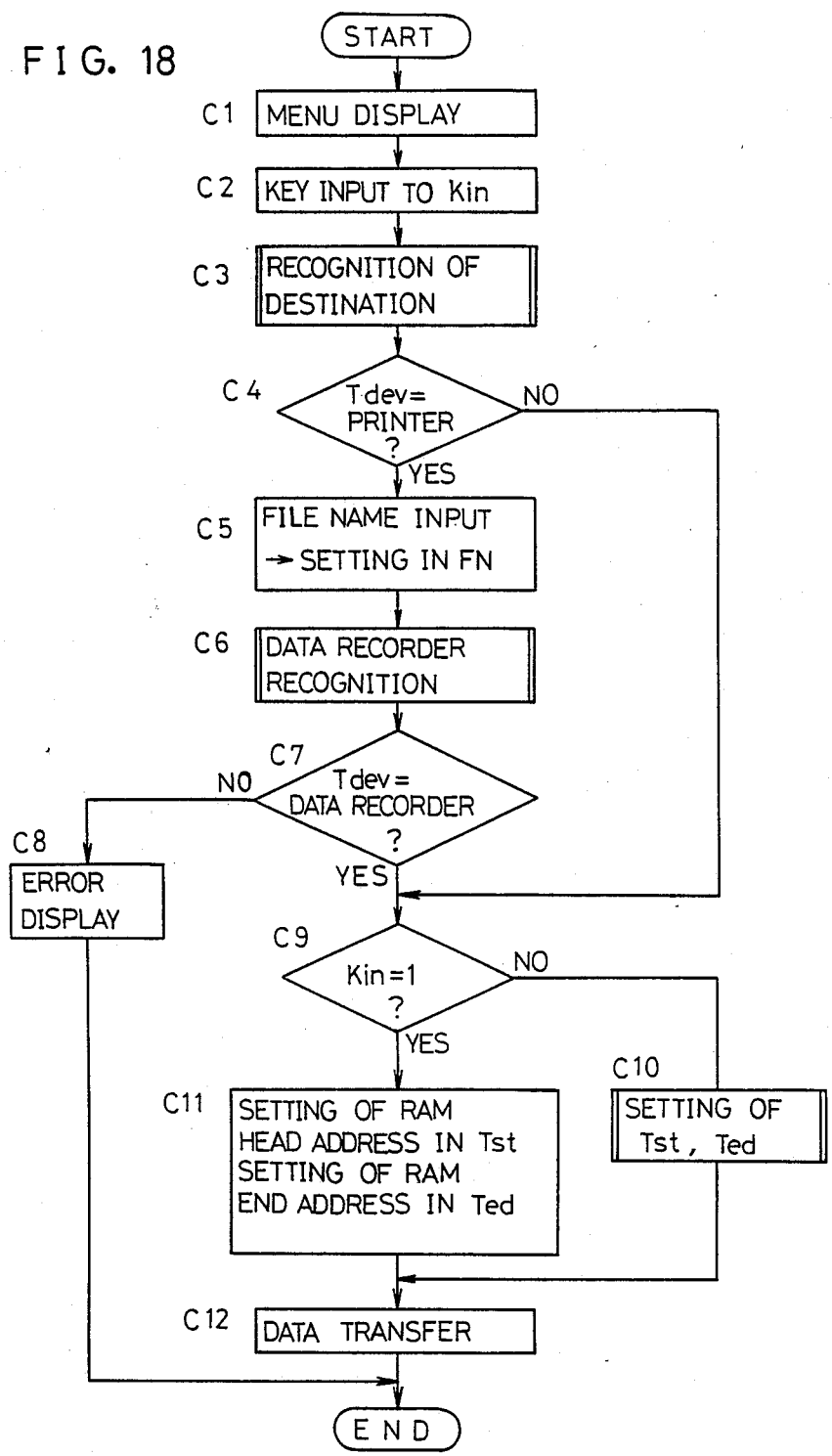

Next, when the "2" key is depressed, the sequence proceeds from step T5 to step T6 for executing a data printing process according to the subroutine shown in FIG. 17. Further when the "3" key is depressed, step T7 is followed by step T8 to execute a data saving process, which is shown in FIG. 18. First, the menu shown in FIG. 14 is displayed, and the system waits for the instruction of: 1. ALL SAVE (to back up all of the data in the RAM 12), or 2. SAVE (to back up programs and data only) (step C1). When the instruction is given, the key number is entered as a variable, whereupon the sequence proceeds to step C3, in which the destination is recognized through the subroutine of FIG. 20.

When the printer is recognized as the destination, a file name is set as a variable. A data recorder is recognized through the subroutine of FIG. 21. Upon identification of the data recorder, the key number set as a variable is checked (step C9). If the number is 1, step C11 follows which sets the head address and the end address of the RAM 12, whereupon all of the data in the RAM 12 is transferred to the data recorder according to the subroutine of FIG. 22.

Figure 19:
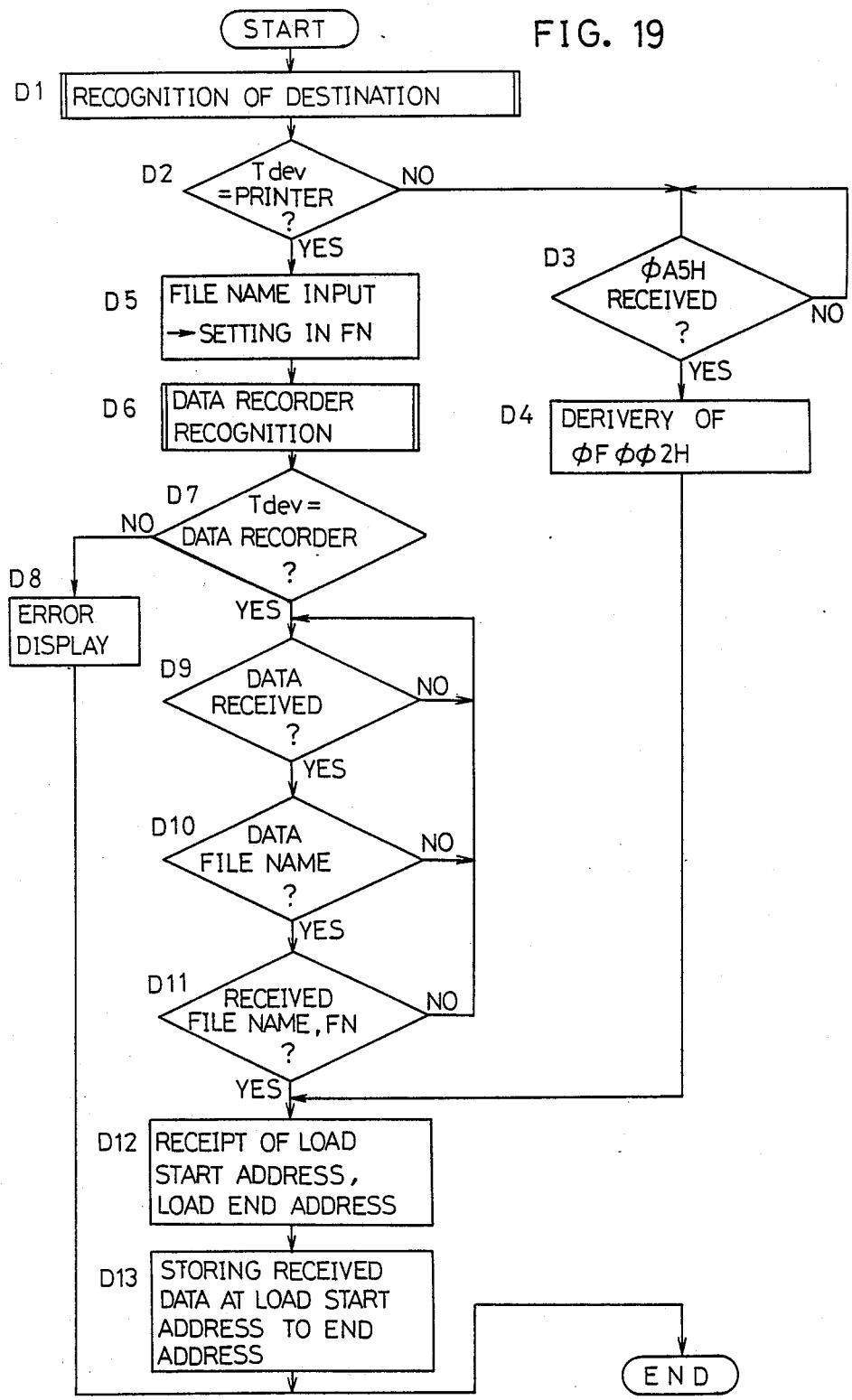
Figure 20:
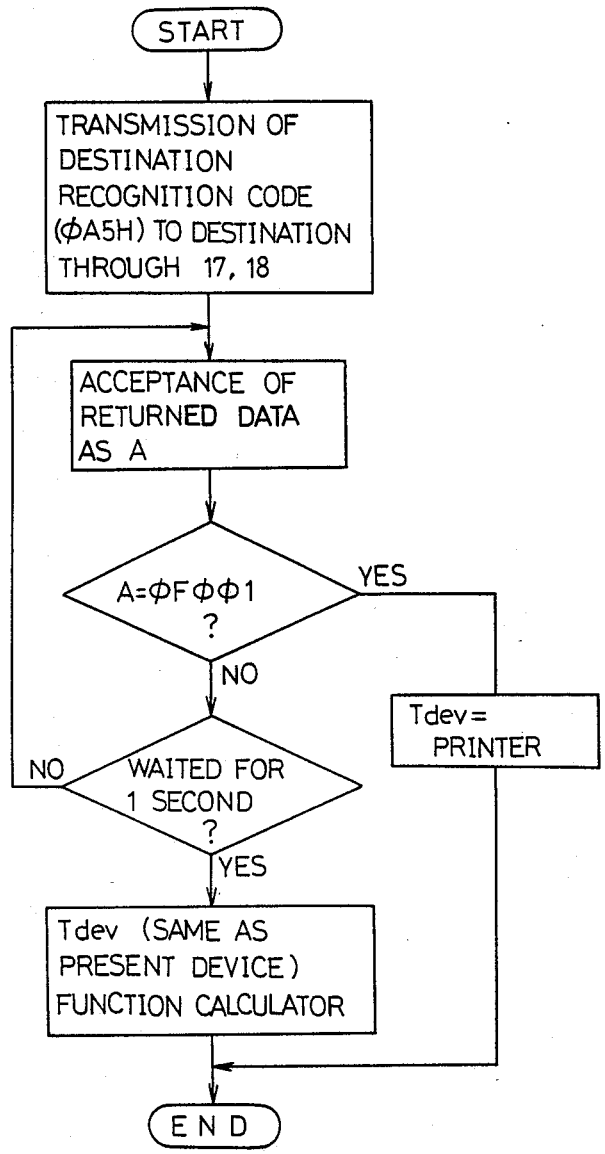
Figure 21:
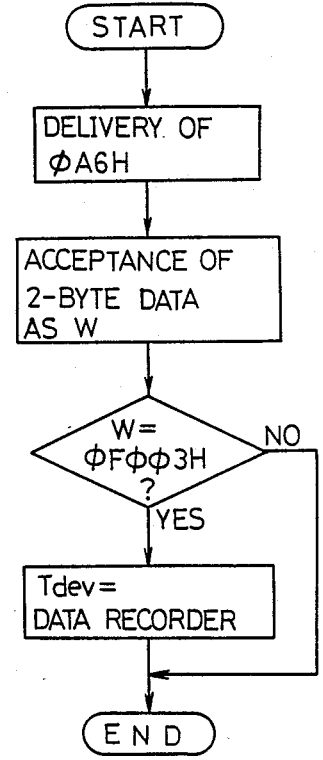
Figure 22:
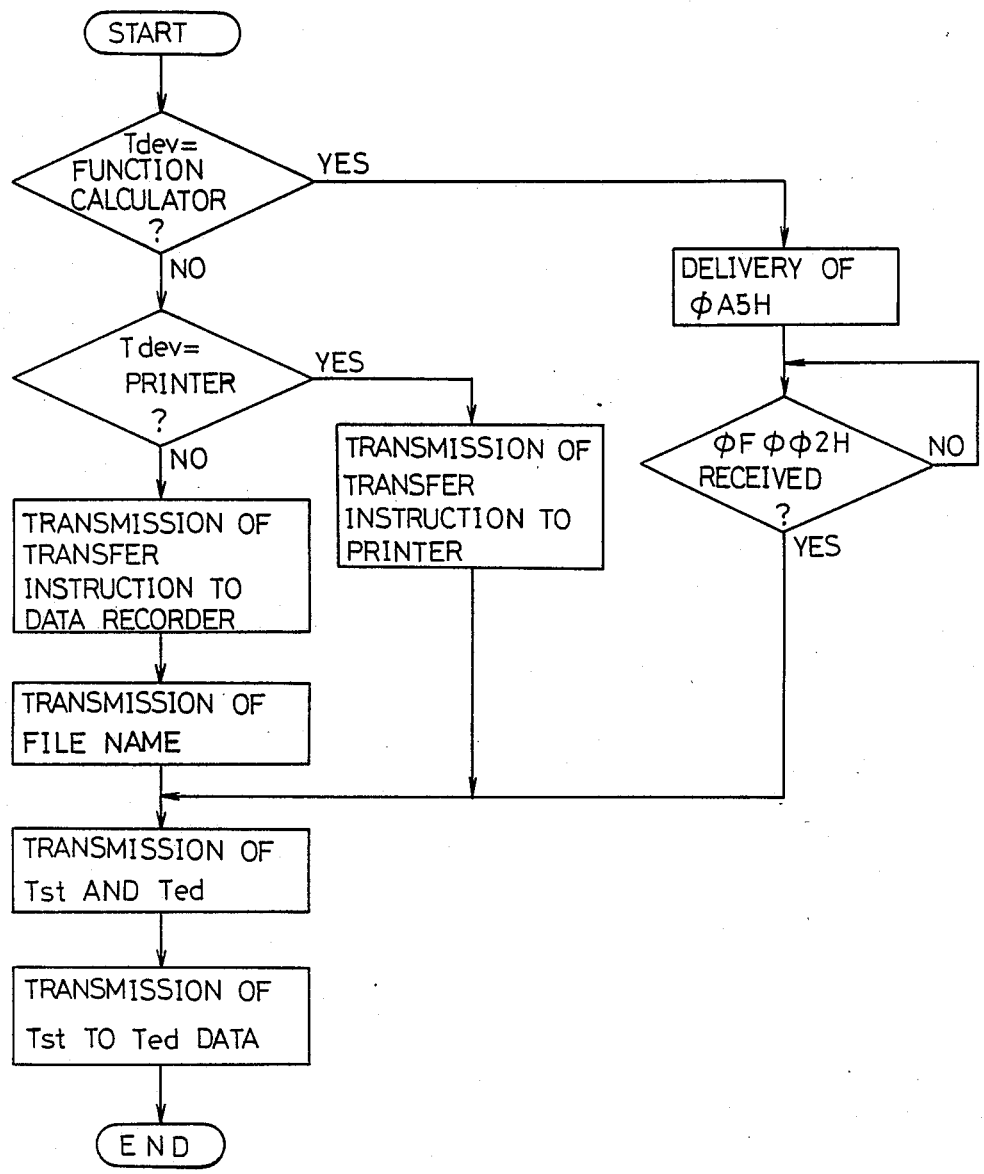

With reference to FIG. 12, upon depression of the "4" key, the sequence proceeds from step T9 to step T10 for executing a data loading process in which the data is transferred from the data recorder to the RAM 12 according to the subroutine of FIG. 19.

FIG. 15 shows another calculator 19, a printer 20 and a data recorder 21 which may be connected to the main body 1 of the calculator via a connector 17.

Cables 18 and 22 are shown which indicate the connection of the external devices to the main body.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An electronic calculator having a graph displaying function, comprising:
   key input means for entering numerical values and a functional equation;
   display means having a plurality of display dots in a uniform distribution over a predetermined area of a display screen for displaying a graph of said functional equation in a two-dimensional coordinate system;
   first memory means for storing said functional equation entered by said key input means;
   first calculating means for calculating a coordinate range of said functional equation specified by said numerical values from said key input means on said two-dimensional coordinate system;
   second calculating means for calculating a specified range for said functional equation in response to a tracing instruction being given by said key input means;
   second memory means for storing said coordinate range and said specified range obtained by said first and second calculating means; and
   display control means for displaying said graph of said functional equation corresponding to said coordinate range of said first calculating means over the entire display screen of said display means, and for subsequently scrolling said display screen along a trace of said graph in response to said tracing instruction and displaying said specified range of said second calculating means for said graph.

2. An electronic calculator as defined in claim 1, wherein said display means comprising a liquid crystal display having a plurality of liquid crystal cells arranged in a matrix form.

3. An electronic calculator as defined in claim 1, further comprising computing means for computing a first coordinate display range along a first axis of said coordinate system for said functional equation based on a second coordinate display range along a second axis of said coordinate system in response to said key input means, whereby when said first coordinate display range along said first axis is specified, said second coordinate display range along said second axis is automatically determined for displaying said graph corresponding to said coordinate range of said first calculating means.

4. An electronic calculator as defined in claim 3, further comprising:
   connection means for connecting an external device to the calculator;
   detection means for detecting whether said external device may be used for storing data; and
   transfer means for transferring data from said first and second memory means to said external device in response to a transfer instruction from said key input means when said external device is connected to the calculator and is detected to be capable of storing data.

5. An electronic calculator as defined in claim 1, further comprising:
   connection means for connecting an external device to the calculator;
   detection means for detecting whether said external device may be used for storing data; and
   transfer means for transferring data from said first and second memory means to said external device in response to a transfer instruction from said key input means when said external device is connected to the calculator and is detected to be capable of storing data.

6. An electronic calculator having a graph displaying function comprising:
   key input means for entering numerical values and a functional equation;

display means having a plurality of display dots in a uniform distribution over a predetermined area of a display screen for displaying a graph in a two-dimensional coordinate system;

first memory means for storing said functional equation entered by said key input means;

first calculating means for calculating a coordinate range of said functional equation specified by said numerical values from said key input means on said two-dimensional coordinate system;

computing means for computing a first coordinate display range along a first axis of said coordinate system for said functional equation based on a second coordinate display range along a second axis of said coordinate system in response to said key input means, whereby when said first coordinate display range along said first axis is specified, said second coordinate display range along said second axis is automatically determined for displaying said graph corresponding to said coordinate range of said first calculating means;

second calculating means for calculating a specified range of said functional equation in response to a tracing instruction being given by said key input means;

second memory means for storing said coordinate range and said specified range obtained by said first and second calculating means; and display control means for displaying said graph of said functional equation corresponding to said coordinate range of said first calculating means and for subsequently scrolling said display screen along a trace of said graph in response to said tracing instruction and displaying said specified range of said second calculating means for said graph.

7. An electronic calculator as defined in claim 6, further comprising:

connection means for connecting an external device to the calculator;

detection means for detecting whether said external device may be used for storing data; and transfer means for transferring data from said first and second memory means to said external device in response to a transfer instruction from said key input means when said external device is connected to the calculator and is detected to be capable of storing data.

* * * * *